United States Patent [19]

Schlegel et al.

[11] 4,231,535
[45] Nov. 4, 1980

[54] COMPOSITE TAPE FOR ARRESTING LANDING AIRCRAFT

[75] Inventors: William R. Schlegel; Harry E. Mayhew, both of Wilmington, Del.

[73] Assignee: All American Industries, Inc., Thomaston, Conn.

[21] Appl. No.: 955,420

[22] Filed: Oct. 27, 1978

Related U.S. Application Data

[63] Continuation of Ser. No. 803,479, Jun. 6, 1977, abandoned.

[51] Int. Cl.² ............................................. B64F 1/02
[52] U.S. Cl. ........................... 244/110 C; 244/110 A; 139/421; 428/231; 428/232; 428/902
[58] Field of Search ................. 428/902, 68, 212, 220, 428/74, 228, 218, 273, 224, 336, 48, 189, 190, 231, 232; 188/113; 139/421, 420 R, 426 R; 244/110 R, 110 C, 110 A

[56] References Cited

U.S. PATENT DOCUMENTS

| | | | |
|---|---|---|---|
| 2,692,741 | 10/1954 | Glass | 244/110 R |
| 2,977,076 | 3/1961 | Byrne et al. | 244/110 R |
| 3,392,939 | 7/1968 | Cruger et al. | 244/110 A |
| 3,419,231 | 12/1968 | McDermott et al. | 244/110 R |
| 3,441,237 | 4/1969 | Bair et al. | 244/110 R |
| 3,456,908 | 7/1969 | Mayhew, Jr. et al. | 244/110 C |
| 3,474,507 | 10/1969 | Thompson | 244/110 R |
| 3,559,697 | 2/1971 | Whalen | 244/110 R |
| 3,568,726 | 3/1971 | Thompson et al. | 244/110 A |
| 3,946,127 | 3/1976 | Eisenmann et al. | 428/48 |

FOREIGN PATENT DOCUMENTS 2125400 12/1971 Fed. Rep. of Germany ....... 244/110 C

*Primary Examiner*—Stanley S. Silverman
*Attorney, Agent, or Firm*—Connolly and Hutz

[57] ABSTRACT

The tape for connecting a landing aircraft to a rotary energy absorber, which is arresting it includes at least two longitudinal sections, a leading section and a trailing section. The leading section absorbs the impact shock when the aircraft is first arrested. It, therefore, has longitudinal filaments with a relatively low modulus of elasticity and is, therefore, made of a material, such as nylon, which can absorb considerable impact stress without breaking. The trailing section of the tape is brought into action during the runout of the tape to gradually stop the aircraft. It has longitudinal filaments with a relatively high modulus of elasticity and extremely high tensile strength. Such modulus of elasticity is accordingly above $12 \times 10^6$ PSI with a tensile strength of at least about 10 grams per denier of 400,000 PSI. A satisfactory trailing section material is, for example, an ultra-high tenacity synthetic fiber, such as Kevlar. Kevlar is the trademark of E. I. DuPont de Nemours & Co. Wilmington, Delaware, for an ultra-high strength fiber. It is described as an aramid fiber and is one of the polyamides aromatic family of fibers. It is described and compared with other materials in DuPont Bulletin K-1, December, 1974. Both ends of the tape are stitched together within a nylon braided cover which may also be coated with a wear-resistant substance such as polyurethane. Loops are provided on the leading and trailing ends of the tape for attachment to the cross runway pendant and energy absorber.

11 Claims, 6 Drawing Figures

U.S. Patent  Nov. 4, 1980  4,231,535
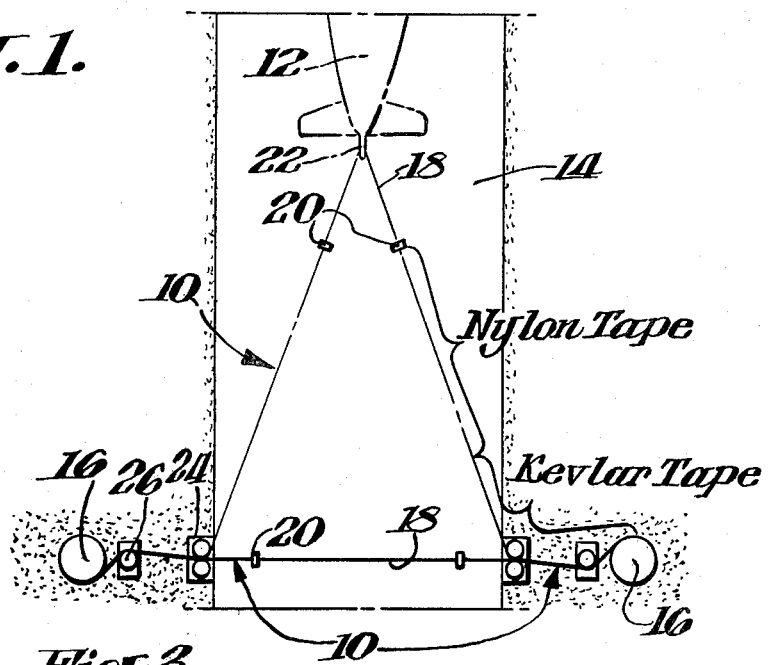
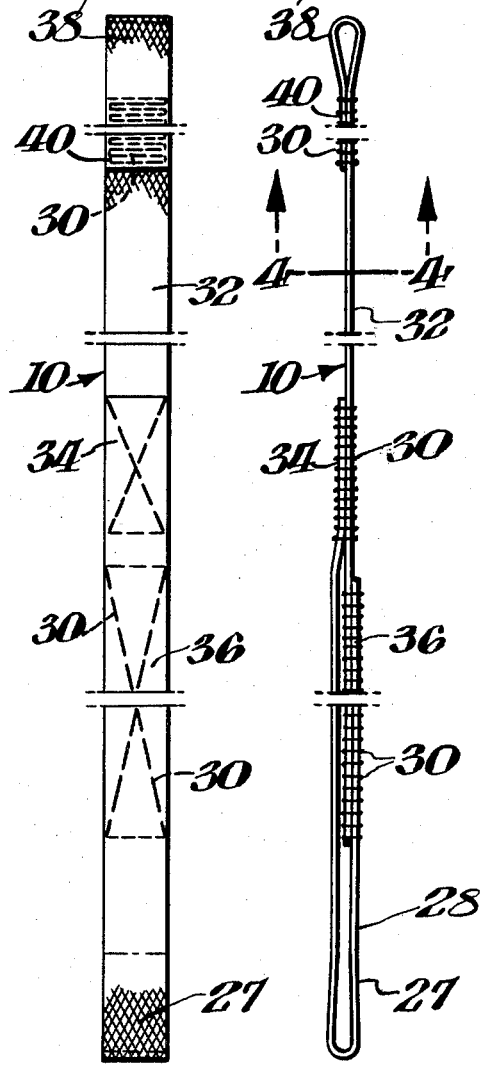
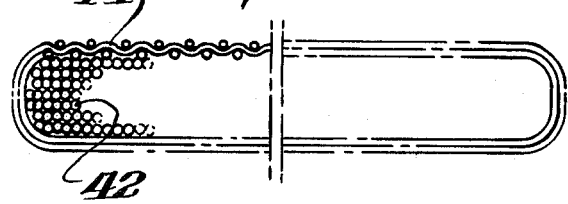
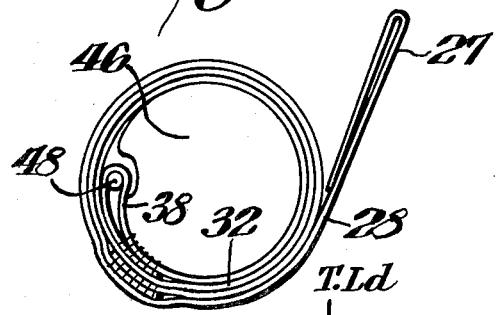
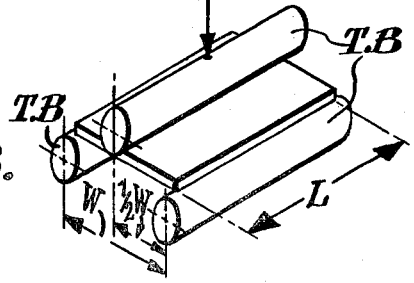

COMPOSITE TAPE FOR ARRESTING LANDING AIRCRAFT

CROSS REFERENCE TO RELATED APPLICATIONS

This is a continuation of application Ser. No. 803,479, filed June 6, 1977 now abandoned.

BACKGROUND OF THE INVENTION

Tapes of nylon have been utilized for approximately twenty years for connecting an arrested landing aircraft to rotary energy absorbers. An example of such a tape is described in U.S. Pat. No. 2,977,076. It includes longitudinal nylon filaments bound together and covered by other nylon filaments. Stronger, lighter and stiffer fibers are available but they are not as shock-absorbant or as wear and abrasion resistant as is required for an aircraft arresting tape. An object of this invention is to provide a strong, light, shock-absorbant, shock-transmissive and wear and abrasion resistant tape for arresting a wide variety of weights and sizes of landing aircraft.

SUMMARY

In accordance with this invention a composite tape for arresting a wide variety of sizes and weights of landing aircraft has a leader of a lower modulus of elasticity longitudinal filaments, such as nylon, attached to a relatively longer trailing section of tape having longutidinal filaments of a stonger, higher modulus of elasticity, such as Kevlar. The longitudinal filaments of nylon and Kevlar are protected from wear and abrasion by a nylon cover. The nylon cover may be braided and the two sections of different filaments may be stitched together with attachment loops provided at both ends of the tape.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a schematic top plan view of a landing aircraft being arrested by the composite tape of this invention which connects the aircraft to an energy absorber;

FIG. 2 is a side view in elevation of the composite tape shown in FIG. 1;

FIG. 3 is an edge view of the tape shown in FIG. 2;

FIG. 4 is a cross-sectional view taken through FIG. 3 along the line 4—4;

FIG. 5 is a schematic view of the composite tape shown in FIGS. 2-4 wrapped around the drum of an energy absorber with most of the turns eliminated to simplify presentation; and FIG. 6 is a three-dimensional view of a piece of the tape shown in FIGS. 1-5 being subject to a stiffness test.

DESCRIPTION OF THE PREFERRED EMBODIMENT

In FIG. 1 is shown a composite tape 10, which is one embodiment of this invention, connecting aircraft 12 landing on runway 14 to a pair of energy absorbers 16 through cross-runway pendant 18 and connectors 20. Cross-runway pendant 18 is, for example, made of steel nylon or cable and is engaged by a hook 22 schematically shown under the rear end of aircraft 12. Connectors 20 may merely be interlocking loops between cross-runway pendant 18 and the leading ends of tape 10, or special connectors may be utilized. Energy absorbers 16 are, for example, of the rotary type described in U.S. Pat. No. 3,172,625. Double sheaves 24 and single sheaves 26 guide tape 10 onto energy absorbers 16.

FIGS. 2 and 3 show that composite tape 10 includes a low modulus leader or leading section 28 sewn in the form of a loop by stitching 30 to the end of high modulus and stronger trailing section 32 at stitched joint 34 and 36. Loop 27 provides a means for attaching the leading section 28 of composite tape 10 to cross-runway pendant 18. The terminal end of trailing tape section 32 has a connecting loop 38 formed by stitched joint 40. Sections 28 and 32 both have internal longitudinal filaments 42, as shown in FIG. 4, encased within a braided nylon cover 44. The only difference between tape sections 28 and 32 is the composition of the longitudinal filaments. The longitudinal filaments in leader tape section 28 are made of nylon, because of its superior shock-absorbing properties. The specification for the nylon tape is as follows:

Width (inches): $6 + 3/16 - 1/16$
Thickness (inches): $0.250 \pm 0.015$
Tensile Strength (Lbs. Min.): 70,500
Modulus (PSI) $\times 10^6$: 0.8

Nylon yarn used in the warp and core of the tape, shall be natural color, bright, high tenacity, long chain polymer prepared from hexamethylene-diamine and adipic acid, or a long chain polymer of epsilon amino caproic acid. Yarn designed for cordage use is not permitted in ground and binder warps. The following are the required physical characteristics of the yarn:

840 Denier, 136-140 continuous filament or 840 denier having at least 6 denier/filament.
Tenacity, 8.5 grams/denier
Melting Point, 418° to 492° F.
25% max. loss of breaking strength, following 100 hours exposure in a weatherometer without water spray.

The construction and weave vary according to the size of tape. The finished tape shall be clean and even woven.

Specifications for the trailing Kevlar section 32 of tape 10 are as follows:

Width (inches): $6'' - 3/16 - 1/16$
Thickness (inches): $0.250 = 0.015$
Tensile Strength: 150000#
Weight not to exceed: 0.55#/Ft.
Kevlar Longitudinal Members (Kevlar 29) (individual filaments).
Tensile Strength PSI: 400,000
Modulus (PSI) $\times 10^6$: 12
Density (g/cc): 1.44
Elongation to Break %: 4.0

Both sections of the tape are subjected to a stiffness test illustrated in FIG. 6 which requires a deflection of certain amounts, such as one inch, when a predetermined load is applied across a section of tape equal to its width. Such loads vary approximately from 55 to 75 pounds. In FIG. 6: the test bars are designated TB. The test load is TLd. The length of the test section is designated L and the width by W. The test specimen is 12 inches long and manufactured width.

The higher modulus of elasticity of section 32 of the tape 10 in conjunction with its greater strength provides the following advantages.

a. Higher engagement velocity for given stress level than either steel or nylon tensile elements because of its unique properties of high tensile strength, high modulus and low density.

b. Better aircraft hook dynamic motion because higher velocity of longitudinal stress wave propagation.

c. Extremely high tensile strength permits significant reduction in tape storage volume over nylon thereby reducing mass moment of inertia of system.

d. Because purchase tapes can be made significantly thinner in the super fibers than for nylon, the energy absorber size can be reduced for any absorber whose retardation is a function of an exponential of rotational velocity, such as a water twister.

To overcome the poor abrasion resistance of Kevlar fibers when dry, a conventional synthetic fiber (such as nylon or polyester) may be used as a jacket or outer braid may be used. An alternate would be to coat the final tape with a highly abrasion-resistant bonded coating, such as a formulation of polyurethane or Hytrel.

Leader section 28 of tape 10 is approximately 120 feet long, which will provide approximately three wraps about drum 46 as schematically shown in FIG. 5. The remainder of tape 10 provided by trailing section 32 is attached by terminal loop 38 to bar 48 on energy absorber drum 46. The length of trailing section 32 is sufficient to provide full runout of tape 10 for arresting an aircraft, which depends on the weight and size of the aircraft.

We claim:

1. A composite elongated woven tape connected to and wrapped around a rotary energy absorber for arresting a landing aircraft in conjunction with cross-runway pendant means comprising a relatively short leading section having longitudinal filaments with a relatively low modulus of elasticity comprising final wrappings about the rotary energy absorber whereby the impact shock created when the aircraft is first arrested is absorbed connected to a longer trailing section having longitudinal filaments with a relatively high modulus of elasticity comprising initial wrappings about the rotary energy absorber whereby high tensile strength, high velocity of stress wave propagation and reduced mass moment of inertia are provided, the leading section being connected to the cross-runway pendant means, the trailing section being connected to the energy absorber whereby the trailing section is brought into action during the runout of the tape to gradually stop the aircraft, and a cover over the tape to protect it from exposure to sun, wear and abrasion.

2. A tape as set forth in claim 1, wherein the tensile strength of the trailing section of the tape is approximately two times the tensile strength of the leading section of the tape, which is doubled to have the same breaking strength.

3. A tape as set forth in claim 2, wherein the tensile strength of the filaments in the trailing section of the tape is approximately 400,000 PSI and their modulus of elasticity is approximately $12 \times 10^6$ PSI.

4. A tape as set forth in claim 3, wherein the density of the trailing section of the tape is approximately 1.44G/CC.

5. A tape as set forth in claim 4, wherein the elongation to break of the filaments in the trailing section of the tape is approximately 4.0%.

6. A tape as set forth in claim 5, wherein the leading section has the following characteristics:
   840 Denier, 136–140 continuous filament or 840 denier having at least 6 denier/filament.
   Tenacity, 8.5 grams/denier
   Melting Point, 418° to 492° F.
   25% max. loss of breaking strength, following 100 hours exposure in a weatherometer without water spray.

7. A tape as set forth in claim 1, wherein the cover comprises a braided cover.

8. A tape as set forth in claim 7, wherein the braided cover is coated with a wear-resistant material.

9. A tape as set forth in claim 1, wherein the leading section is comprised of nylon.

10. A tape as set forth in claim 9, wherein the trailing section is comprised of aramid fiber.

11. A tape as set forth in claim 10, wherein the filaments in the trailing section are comprised of Kevlar 29 having a modulus of elasticity of about $12 \times 10^6$ PSI.

* * * * *